No. 694,516. Patented Mar. 4, 1902.
M. L. AKERS & W. L. RICHARDS.
PANORAMIC CAMERA.
(Application filed May 25, 1901.)
(No Model.) 4 Sheets—Sheet 3.

No. 694,516. Patented Mar. 4, 1902.
M. L. AKERS & W. L. RICHARDS.
PANORAMIC CAMERA.
(Application filed May 25, 1901.)
(No Model.) 4 Sheets—Sheet 4.

Witnesses
Inventors
M. L. Akers
W. L. Richards
By C. A. Snow & Co.
Attorneys

UNITED STATES PATENT OFFICE.

MAURICE L. AKERS AND WILLIS L. RICHARDS, OF IONE, OREGON, ASSIGNORS OF ONE-FOURTH TO JOHN E. WILLIAMS, OF IONE, OREGON.

PANORAMIC CAMERA.

SPECIFICATION forming part of Letters Patent No. 694,516, dated March 4, 1902.

Application filed May 25, 1901. Serial No. 61,399. (No model.)

*To all whom it may concern:*

Be it known that we, MAURICE L. AKERS and WILLIS L. RICHARDS, citizens of the United States, residing at Ione, in the county of Morrow and State of Oregon, have invented a new and useful Panoramic Camera, of which the following is a specification.

This invention relates to cameras, and has for its object to provide an improved camera which is designed to take panoramic views from a fixed center and also arranged for taking fixed views as well, it being, furthermore, arranged to make complete circular exposures and also sectional exposures of predetermined lengths.

Another object resides in the provision of improved means for rotating the camera and feeding the sensitive film in a predetermined relation, so as to secure an effective exposure of the entire length of the film during a complete transit of the camera and also to insure the accurate stopping of the camera and the film at the completion of the transit of the camera and also at predetermined intervals in the transit to secure sectional views. Moreover, it is designed to arrange for conveniently starting the camera in its circular movement and also to provide for recharging the camera with a new film without the aid of a dark room.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings.

Like characters of reference designate corresponding parts in all of the figures of the drawings.

In carrying out the present invention there is provided an ordinary camera-box 1, which is divided by an intermediate horizontal partition 2 into an upper camera-chamber and a lower operating-mechanism chamber. In other words, the upper chamber is designed for the mounting of the sensitive film and its coöperating elements, while the lower chamber is designed for containing the spring-actuated mechanism for rotating the camera, feeding the film, and also for starting and stopping the movement of the camera.

For the support of the camera there is provided the usual tripod-head 3, upon the top of which is fixed a block 4, forming a base, from which rises a fixed shaft 5, that is held against rotation by means of a set-screw 6, piercing the block and bearing against the side of the shaft. The upper projected portion of this shaft passes through the bottom of the camera-box and has an upper terminal bearing in the partition 2, whereby the camera is adapted to rotate upon the shaft as an axis.

Figure 3:
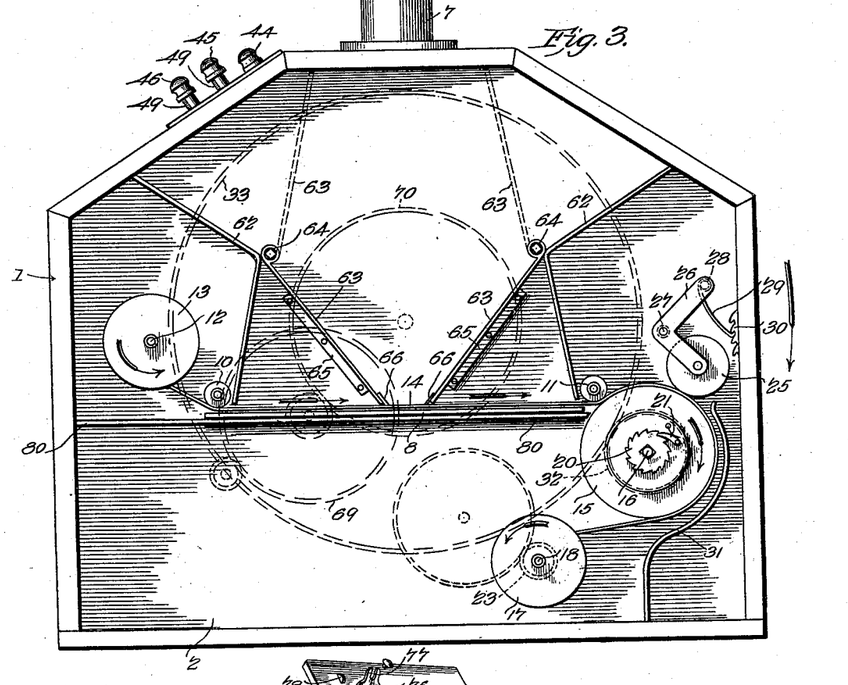
Fig. 3 is a top plan view with the top of the box removed.
Figure 4:
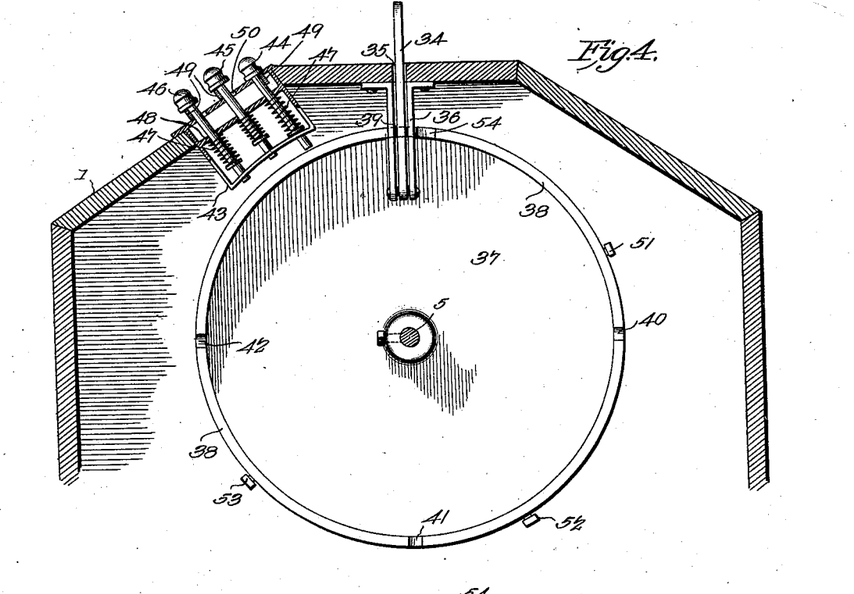
Fig. 4 is a detail horizontal sectional view taken through the lower part of the front of the camera to illustrate the starting and stopping mechanism.

In the front of the upper chamber there is provided the usual lens-tube 7, and at a suitable distance in rear of the tube there is provided a lower film-track 8 in the form of an angle-strip extending transversely across and secured to the upper side of the partition 2. A corresponding upper track 9 is secured to the under side of the top of the camera-box, it being designed to have the opposite longitudinal edges of the sensitive film travel in engagement with the respective tracks, thereby to be maintained straight and flat as it passes across the field of the lens. At the opposite ends of the tracks and immediately in front thereof there are mounted the vertical guide-rollers 10 and 11, which have terminal bearings in the top of the camera and the partition thereof. In front of the track and slightly beyond one end of the track, preferably the left-hand side of the camera looking toward the front thereof, as shown in Fig. 3 of the drawings and also in Fig. 1, there is mounted an upright shaft 12, having an upper terminal bearing in the top of the camera-box, which top is hinged to form a lid, so as to give access to the interior of the box at the top thereof. Upon this shaft there is placed a filled film-cartridge 13, which is designed to rotate loosely thereon, the free end of the film being passed between the adjacent guide-roller 10 and the upper and lower tracks and outwardly between the opposite guide-roller and the opposite ends of the tracks, whereby the intermediate film portion 14 is passed transversely across the camera in rear of the lens. Slightly beyond the right-hand end of the track there is provided a feed-roller 15, which is loosely mounted upon an upright shaft 16, terminally journaled in the camera top and the partition. It will be observed that the film passes across the front of this feed-roller, thence substantially half-way around the same, from which it extends inwardly and around the front of an empty film-carriage 17, which is fitted downwardly over the top of an upright rotatable shaft 18, journaled terminally in the top and bottom of the camera-box. Any suitable means may be provided for interlocking the shaft and the cartridge—as, for instance, a pin or lateral projection 19, carried by the shaft and snugly received within a corresponding notch or seat formed in the lower edge of the cartridge. The opposite cartridges are of the common or ordinary form, having the usual longitudinal slot for the connection of the respective ends of the film, whereby a rotation of the cartridge 17 is designed to feed the film from the other cartridge, as will be understood. It is designed to have the feed-roller 15 normally connected to its shaft, preferably by means of a ratchet-disk 20, fitted upon the upper polygonal end of the shaft and engaged by a spring-pressed ratchet-dog 21, these parts being arranged to interlock the shaft and disk for simultaneous movement or rotation in the direction indicated by the arrow to feed the film from the cartridge 13 to the other cartridge 17.

To apply motion to the receiving-cartridge 17, there is provided a suitable spring-motor 22, having the usual train of gears, which are in mesh with a pinion 23, provided upon the lower portion of the rotatable shaft 18. It will be noted that the motor is mounted upon the bottom of the camera-box and within the lower compartment and has a winding-stem 24 projected through the bottom of the camera and constructed for the reception of a key whereby to wind the spring. When the spring-motor is in operation, the shaft 18 will also be operated, thereby turning the receiving-cartridge and feeding the film thereto.

It will be understood that the roller 15 has a frictional surface formed in any suitable manner to insure a rotation of said roller by the passage of the film in frictional contact therewith. To furthermore insure a proper engagement of the film with the roller, there is provided an elastically-yieldable pressure-roller 25, as best indicated in Fig. 3, and lying against the front side of the roller 15, so as to press the film in firm contact therewith. This pressure-roller is journaled at opposite ends upon the respective terminals of the upper and lower angle pivotal brackets 26, which are respectively pivoted to the camera top and the partition in the manner shown in Fig. 3, wherein the upper bracket is pivoted at its middle or apex, as at 27, to the top of the camera, and an upright rod 28 connects the opposite free ends of the brackets, thereby completing a rocking frame which is elastically yieldable under the tension of a spring 29, having one end connected to the intermediate portion of the rod and its opposite free end in adjustable engagement with a rack 30, provided upon the inner face of the adjacent side of the camera-box, so as to vary the tension upon the frame and the pressure-roller. A suitable upstanding bowed guide 31 embraces the outer side of the feed-roller.

Figure 1:
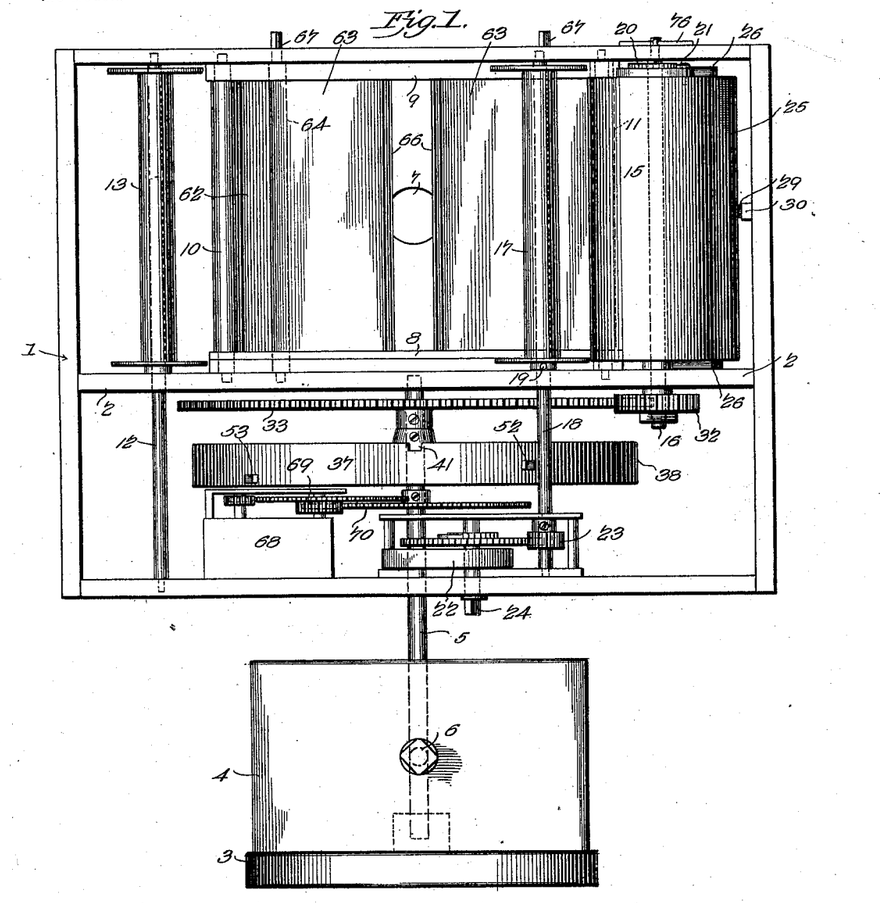
Figure 1 is a rear elevation of the present form of camera with the back of the camera-box removed.
Figures 2, 8:
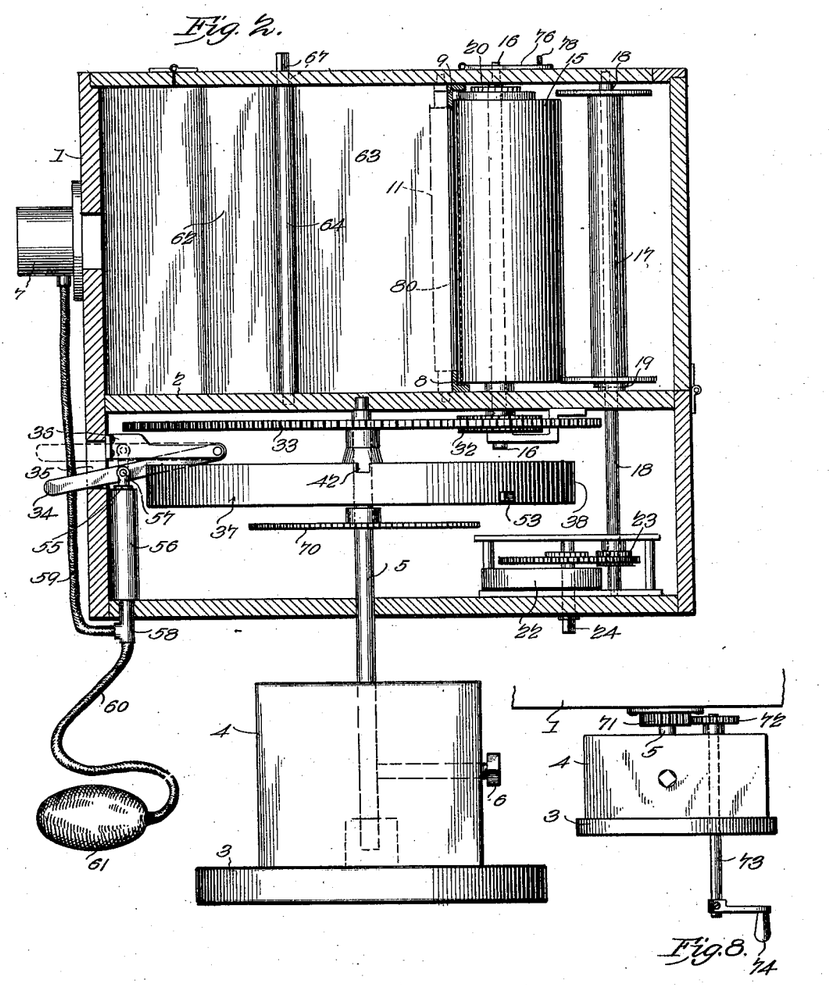
Fig. 2 is a vertical longitudinal sectional view of the camera from front to rear thereof.
Fig. 8 is a detail view of one form of means for governing the rotation of the camera.

For rotating the camera upon the shaft 5 the shaft 16 of the feed-roller 15 is projected into the lower compartment, as indicated in Figs. 1 and 2, and provided with a fixed pinion 32, which is in mesh with a circular toothed rack or wheel 33, carried by the fixed shaft 5, so that as the feed-roller rotates in the direction of the arrow in Fig. 3 the pinion 32 will travel about the fixed rack, thereby rotating the camera in the direction of the arrow placed at the outer side thereof in Fig. 3. It will be here observed that the camera is rotated in a fixed relation to the speed of the feed of the film, as it is the film that drives the feed-roller 15. Moreover, the periphery of the feed-roller should be of such a length as to cause a predetermined number of complete rotations of the feed-roller in passing around the circular rack or track. The proper length of film to take in a complete transit of the lens may be readily determined by computing the length of the circumference of a circle having for its axis the focal length of the lens, which in the present camera is the length between the inner side of the lens and the focal plane or the position of the film, as it is at this point that the lens focuses. In practice a suitable length of some black flexible material is connected to each end of the film, so that the latter may be entirely wound upon the receiving-cartridge, so that the entire film may be contained upon either cartridge, whereby the film is not exposed in placing the same within the camera and also when removing the film, and thus the camera may be recharged without requiring a dark room. Furthermore, the peripheral length of the feed-roller is a fractional part of the length of the film corresponding to the total number of rotations of the roller in making a complete transit about the axis of the camera, whereby the film will be completely unrolled from one cartridge and rolled upon the other by a complete transit of the camera.

Figures 5, 6:
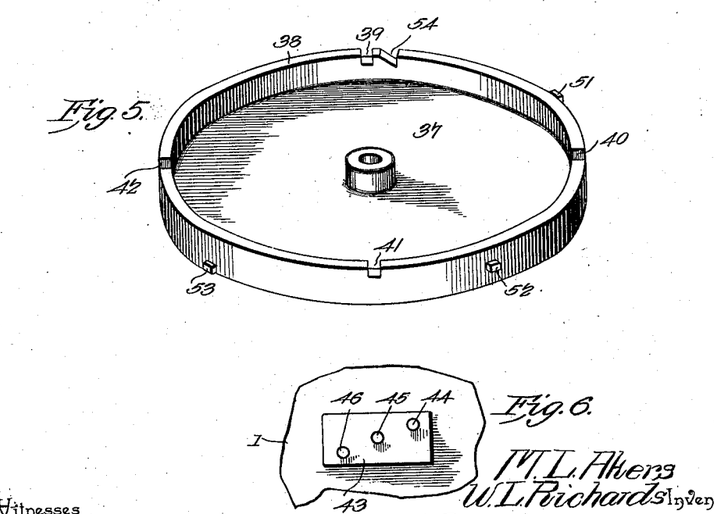
Fig. 5 is a detail perspective view of the fixed circular rack, whereby the camera is locked at different periods in its transit.
Fig. 6 is a detail elevation looking at the inner ends of the adjustable stop-pins carried by the camera-box and for coöperation with the stopping and locking rack.

For starting, stopping, and locking the camera there is provided a latch-arm 34, which projects in opposite directions through a vertical slot or opening 35, formed in the front of the camera-box and alined directly below the lens, the inner end of the latch being projected into the lower chamber or compartment and adjacent to the under side of the circular track 33. The inner end of the latch is pivoted in a bifurcated bracket 36, carried by the camera-box, so that the outer free end of the latch may be moved vertically and normally lie at the bottom of the slot. Fixed upon the central shaft 5 is a circular disk 37, provided with an upstanding marginal rim or flange 38, upon which the intermediate portion of the latch rests. In the upper edge of this rim there is provided a plurality of vertical notches or seats 39, 40, 41, and 42, which are arranged at equal intervals of ninety degrees, it of course being understood that a greater number of notches may be employed, if desired. The latch normally occupies the notch 39, whereby the camera is locked against movement by the spring-motor, and by raising the latch out of engagement with the rack formed by the notched rim the camera-box is free to be rotated by the spring-motor, the latch being carried with the box and traveling upon the rim or rack until it drops into the next adjacent notch 40, thereby stopping and locking the camera at the completion of a quarter-revolution. To prevent the camera-box from rotating too far for the latch to engage with the first notch, there is provided an adjustable stop device, consisting of a rectangular frame 43, set into an opening in the front of the camera-box and at the right-hand side of the latch when looking at the front of the camera. Slidably mounted through corresponding perforations in the inner and outer side of the frame are a plurality of stop-pins— as, for instance, three pins 44, 45, and 46—the opposite ends of which project beyond the frame and are provided at their outer ends with suitable enlarged heads or finger-pieces for convenience in adjusting the same and to form stops to limit the inward movement of the pins. Each pin has its inner end portion embraced by a helical spring 47, that has one end connected to the pin and its opposite end bearing against a transverse cross-bar 48, whereby the pin is held yieldably at its inner limit, with its inner end adjacent to the outer peripheral edge of the circular rack 37, as indicated by the pin 44. Furthermore, each pin is provided with a lateral projection 49, lying adjacent to the inner end of the head or finger-piece thereof and working through a slot or notch 50, formed in the outer end of the frame and intersecting the opening through which the pin slides. The pin is also capable of rotation, so that by drawing the pin outwardly until the projection passes through the notch and then turning the pin slightly the projection may be engaged with the outer side of the frame, as indicated by the pins 45 and 46, thereby to hold the pins withdrawn from the circular rack and out of position to coöperate therewith. At an interval of ninety degrees from the first pin 44 there is provided an external stud or projection 51 upon the outer margin of the circular rack 37 and located in the path of the said pin, whereby when the camera has rotated to bring the pin into engagement with the stop shoulder or projection 51 the camera will be stopped and the latch will drop into the adjacent notch 40, and thereby lock the camera against accidental rotation in opposite directions. As indicated in Fig. 6, the stop-pins are arranged in different horizontal planes and the circular rack is provided with other stop projections 52 and 53, located in different horizontal planes and in the paths of the respective pins 45 and 46, so as to stop the camera at the completion of a half-rotation and three-quarters of a rotation, respectively. Should it be desired to have the camera make a semirotation, the terminal pins are drawn outwardly and the intermediate pin 45 is set to bring its inner end adjacent to the circular rack, whereby upon the rotation of the camera the pin will strike the projection 52, whereupon the latch will drop into the adjacent notch 41, thereby locking the camera after the completion of a semirotation. It will be understood that the impetus of the camera is sufficient to carry the latch over the notch 40 without dropping therein, the latch engaging with the notches only when stopped opposite one of the same by means of one of the adjustable stop-pins. It will be observed that the stop projections are arranged at predetermined intervals about the circular rack with respect to the respective pins and the notches are disposed beyond the respective projections according to the interval between the corresponding pin and the latch, so that the pins and projections and the latch and the notches may simultaneously coöperate, for the relation of the pins and the latch remain unchanged. For making a complete rotation or transit of the camera all of the pins are withdrawn, so that the latch may travel entirely around the circular rack, there being a ratchet-notch 54 formed just in advance of the initial notch 39 or between the latter and the first projection 51 and arranged so that the latch will automatically drop into said ratchet-notch and stop the camera after it has made a little more than a complete rotation. The camera may be given more than one complete rotation, as the film is lengthened by the application of flexible strips to the opposite ends thereof.

It is of course desirable that the adjustable stop-pins should set nearly radial with respect to the circular rack, and therefore the front of the camera-box has been made polygonal and the pins set in that portion of the front which gives the desired disposition of the pins.

While the outer free end of the latch has been arranged for convenience in lifting the latch out of engagement with the circular locking-rack, it is also designed to have the latch and the shutter simultaneously operated by means of an ordinary air-bulb, and in carrying out this feature there is provided a pair of telescoped cylindrical air-chambers 55 and 56, similar to those commonly employed in connection with camera-shutters and mounted vertically within the lower compartment and directly below the latch, the inner and movable cylinder or tube having a pivotal connection 57 with the latch, so that the elevation of the tube 55 will also raise the latch out of engagement with the rack. Extending through the bottom of the camera-box is a three-way coupling or T 58, one branch of which passes upwardly through the camera-bottom and communicates with the air-cylinders, the lateral branch, which lies below the camera-bottom, being connected to a tube 59, that communicates with the shutter mechanism in the ordinary manner, and the pendent branch is provided with a flexible tube 60, having an outer terminal air-bulb 61, so that by compressing the bulb the shutter and the latch will be simultaneously operated to uncover the lens and release the camera-box for rotation by the spring-motor. When the camera-box has been brought to rest by the stop mechanism, the air-bulb is released, thereby simultaneously closing the shutter and permitting the latch to drop into engagement with the locking-rack.

As best indicated in Fig. 3 of the drawings, it will be seen that light-excluding vertical partitions 62 are provided at opposite ends of the film-track and extend from the track to the front of the camera and at opposite sides of the lens, the partitions also extending from the horizontal partition 2 to the top of the camera, thereby excluding light from entering the front portion of the camera and attacking the sensitive film.

It will of course be apparent that when the camera is moving it is essential that only a comparatively narrow portion of the film be exposed to the light entering through the lens, and therefore there has been provided a pair of opposite adjustable reducing-partitions 63, each of which has one vertical end hinged to the top and bottom of the upper compartment, as at 64, and capable of being swung horizontally in a direction front and rear of the camera. The rear swing of each adjustable partition is limited by means of a stop-strip 65, secured to the upper side of the bottom of the upper compartment and inclined from the hinge of the partition rearwardly and inwardly toward the film-track, so that when the partition is engagement with the stop, as shown in full lines in Fig. 3, the outer free vertical edge of the partition is in engagement with the front side of the film, and the partitions are converged, so that a comparatively narrow exposure-opening is provided between the outer free edges of the reducing-partitions. The stiff free ends of the partition do not lie in direct contact with the film, but are provided with longitudinal flexible strips 66, which engage the film, so as to exclude light and prevent injury to the film. In making a time exposure when the camera is at rest the partitions are turned or adjusted to the positions indicated in dotted lines, whereby the entire portion of the film which is in the film-track is exposed. For convenience in adjusting each hinged partition it is mounted upon a rotatable spindle, the upper end of which is projected through an opening in the top of the camera, as at 67, (shown in Fig. 1,) and formed into key stems or shafts for the reception of a key to rotate the shafts, or the same may be formed into finger-pieces, as desired.

In order that the camera-box may be prevented from rotating too rapidly, there is provided governing means, consisting of a rotary fan mechanism 68 (indicated in Fig. 1) and mounted upon the bottom of the camera within the lower compartment. This fan has a train of gears 69, which are in operative relation with respect to a fixed wheel or toothed track 70 upon the fixed shaft 5, whereby the fan is driven by the rotation of the camera and the resistance of the fan is utilized to retard the movement of the camera and produce a steady and uniform rate of movement. Another governing device has been shown in Fig. 8 and consists of a gear 71, mounted upon the center of the bottom of the camera-box and loosely receiving the shaft 5. This gear is in mesh with another gear 72 of the same diameter and carried by the upper end of a rotatable vertical shaft 73, piercing the head of the tripod and the block thereon, the lower end of the shaft being provided with a crank-handle 74 for manipulation by the operator of the camera to prevent too rapid rotation of the camera-box.

Figure 7:
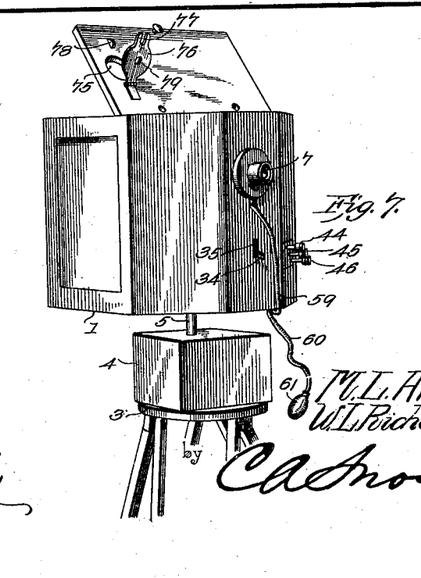
Fig. 7 is a detail perspective view of the camera looking at the front thereof.

As indicated in Fig. 7 of the drawing, the hinged top of the camera-box is provided with an opening 75 for the exposure of the ratchet device upon the top of the roller 15, and thereby to permit of the disengagement of the pawl from the ratchet-disk, should it be desired to rotate the feed-roller independently of the rotation of the camera. This opening is normally closed by means of a metallic cover 76, hinged to the outer side of the top of the camera-box and provided at its opposite end with a bifurcated extension 77 for engagement by a turn-button 78, mounted upon said top and designed to hold the cover closed. In the center of the cover there is provided a perforation 79, designed to receive the top of the rotatable shaft 16, so as to provide an upper terminal bearing therefor.

It will be understood that the top of the camera-box is open to permit of the film being mounted in place, after which a light-excluding plate 80 (best shown in Fig. 2) is dropped downwardly, so as to rest against the back of the upstanding flange portion of the lower film-track, and then the top is closed downwardly, so that the upper track may engage the top of the said plate, and thereby hold the same in place to exclude light from the film.

What is claimed is—

1. In a photographic camera, the combination with a rotatable camera-box, of an upstanding circular flange having notches in the upper edge thereof, and a gravitating latch carried by the box to engage the notches of the said flange for locking the box at a plurality of predetermined points in the rotary path thereof.

2. In a photographic camera, the combination with a rotatable camera-box, of an upstanding circular flange having notches in the upper edge thereof and stop devices on the outer side thereof at intervals corresponding to the location of the notches, a gravitating latch carried by the box to engage the said notches, and adjustable means also carried by the box to coact with said stop devices.

3. In a photographic camera, the combination with a rotatable camera-box, of an upstanding circular flange having receptive means in the upper edge at intervals and stop devices on the outer side at different elevations, a gravitating latch carried by the box to engage said receptive means, and adjustable members also carried by said box and disposed at different elevations to engage said stop devices.

4. In a photographic camera, the combination with a rotatable camera-box, of a relatively fixed stop device therefor, and a plurality of stop projections carried by the box and adjustable independently into coöperative relation with respect to the fixed stop device.

5. In a photographic camera, the combination with a rotatable camera-box, of a fixed circular stop device mounted concentrically with respect to the axis of the camera, and provided in one edge with a notch, and also having a marginal stop projection, a stop projection carried by the camera-box and constructed for engagement with the stop projection of the circular stop device, and a pivotal latch mounted upon the box, traveling around the circular stop device, and constructed to be seated in the notch simultaneously with the engagement of the stop projections.

6. In a photographic camera, the combination with a rotatable camera-box, of a circular fixed stop device, provided in its upper edge with a notch, and also having an outwardly-directed projection upon its margin, a stop projection carried by the box and constructed for engagement with the former projection to stop the camera, and a pivotal gravity-latch mounted upon the box, traveling in frictional engagement with the upper edge of the fixed stop device, and constructed to drop into the notch simultaneously with the engagement of the stop projections.

7. In a photographic camera, the combination with a rotatable camera-box, of a circular fixed stop device having an upstanding marginal rim or flange, which is provided in its upper edge with a plurality of notches, and upon its margin with a plurality of stop projections corresponding to the notches, a pivotal latch mounted upon the box, traveling in frictional engagement with the upper edge of the rim and constructed to drop into the respective notches, and a plurality of stop-pins carried by the box and independently adjustable into coöperative relation with respect to the stop projections.

8. In a photographic camera, the combination with a rotatable camera-box, of a plurality of endwise-adjustable stop-pins carried by the box and located in different horizontal planes, and a plurality of fixed stop devices corresponding to the respective pins and located in different portions of the respective paths thereof.

9. In a photographic camera, the combination with a rotatable camera-box, a fixed circular stop device located concentrically with respect to the axis of the camera, and provided with a plurality of outwardly-directed marginal stop projections located in stepped planes, and a plurality of endwise-adjustable stop-pins carried by the camera and independently adjustable into coöperative relation with respect to the corresponding stop projections, the pins being located in the same planes with the corresponding projections.

10. In a photographic camera, the combination with a rotatable camera-box, of a fixed stop device within the box, and provided with a lateral stop projection, and an endwise-adjustable stop-pin projected in opposite directions through the camera-box, the inner end of the pin being in coöperative relation with the stop projection at the inner limit of the pin.

11. In a photographic camera, the combination with a rotatable camera-box, of a fixed stop device within the box, and provided with a stop projection, and an endwise and rotatably adjustable stop-pin projected in opposite directions through one side of the camera-box, and provided with a lateral projection to lie alternately at opposite sides of the said side of the box, there being an opening in the box to accommodate the projection, and a spring to hold the pin at one limit, the projection being constructed for engagement with the box to hold the pin at the opposite limit thereof, and the inner end of the pin being in coöperative relation with respect to the stop projection when the pin is at its inner limit.

12. In a photographic camera, the combination with a rotatable camera-box, a circular stop device fixed concentrically with the axis of the camera and within the box, the upper side of the stop device having a plurality of notches formed therein at predetermined intervals, stop projections upon the margin of the device and arranged in horizontally-stepped planes and between adjacent pairs of notches, a pivotal gravity-latch mounted upon the camera-box and traveling in frictional engagement with the upper side of the stop device and constructed to drop into the respective notches to lock the camera-box against rotation, and a plurality of endwise-adjustable stop-pins projected in opposite directions through one side of the box and arranged in stepped planes corresponding to the stop projections, the inner ends of the pins being constructed for engagement with the corresponding projections when at their inner limits, and the interval between each projection and the adjacent notch being equal to the interval between the corresponding stop-pin and the latch.

13. In a photographic camera, the combination with a rotatable camera-box, of a circular fixed stop device, having a plurality of notches formed in the upper side thereof and stop projections corresponding to the notches, a pivotal latch mounted upon the box in frictional engagement with the top of the stop device and constructed to drop into the respective notches thereof, and a plurality of stop projections, which are carried by the box and are independently adjustable into coöperative relation with respect to the respective stop projections, and there being a ratchet-notch formed in advance of the initial notch and constructed to receive the latch at the completion of a revolution of the box.

14. In a photographic camera, the combination with a rotatable camera-box, of a fixed internal stop device, and a latch coöperating therewith and projected outwardly through one side of the box, whereby the latch may be tripped from the exterior of the box.

15. In a photographic camera, the combination with a rotatable camera-box, of an internal circular fixed stop device, and a gravity-latch pivotally mounted upon the box, in coöperative relation with respect to the stop device, and also projected outwardly through a slot in one side of the camera-box, whereby the latch is accessible from the exterior of the camera.

16. In a photographic camera, the combination with a fixed vertical shaft, of a camera-box rotatably mounted thereon, a circular stop device located within the camera-box and fixed concentrically upon the shaft, and a pivotal latch mounted upon the box, located in coöperative relation with respect to the stop device, and also projected exteriorly of the box for access thereto to trip the latch.

17. In a photographic camera, the combination with a rotatable camera-box, having a fixed support, of a fixed circular toothed track upon the support, opposite film holding and winding rollers, means for driving the winding-roller upper and lower film-guides for the respective edges of the sensitive film, and a feed-roller constructed to be frictionally driven by the film, and also having a pinion traveling upon the fixed toothed track, whereby the camera-box is rotated and the film is fed.

18. In a photographic camera, the combination with a rotatable camera-box, having a fixed axial support, of a circular toothed track fixed upon the support, means for feeding a sensitive film across the focal plane of the camera, a film-driven feed-roller, having a rotatable shaft, which is provided with a pinion in mesh with the circular track, and means for permitting the feed-roller to be loosely rotated in opposite directions upon its shaft.

19. In a photographic camera, the combination with a rotatable camera-box, of a film-driven feed-roller having a pinion, a circular toothed fixed track in mesh with the pinion, one end of the roller having means to permit of an independent rotation of the roller upon its shaft, there being an opening in the part of the camera-box which is at the said one end of the roller, and a removable cover normally closing the opening and having a bearing for the adjacent end of the shaft, whereby access may be had to the means for permitting of an independent rotation of the roller.

20. A camera-box, having a removable top, corresponding film-guides carried by the top and bottom respectively of the box, and a removable light-excluding plate held between the opposite guides.

21. A camera, having opposite fixed light-excluding partitions extending forwardly from the focal plane and at opposite sides of the lens, and opposite adjustable light-excluding partitions hinged between the focal plane and the front of the camera and at the respective fixed partitions, and rearwardly-converging stops in advance of the plane of the film to limit the rearward swing of the respective partitions.

22. In a photographic camera, the combination with a fixed vertical shaft, of a rotatable camera-box mounted thereon, a circular toothed track fixed upon the shaft and within the box, a circular stop and locking device also fixed upon the shaft and within the box, a plurality of adjustable stop devices carried by the box and constructed for coöperation with the circular stop device at different points in the rotation of the box, a locking-latch mounted upon the box and in coöperative relation with the locking device to interlock therewith when the camera is stopped, a spring-motor within the box, a film-holding roller, a film-winding roller in operative relation with respect to the motor, a feed-roller frictionally driven from a film, and having a pinion in mesh with the circular track, and a light-excluding partition located between the focal plane and the lens and adjustable to vary the size of the exposed portion of the focal plane.

23. In a rotatable camera, the combination with a locking device therefor, of an operative connection between the locking device and the lens-shutter, whereby the latter is simultaneously actuated by the operation of the former.

24. In a panoramic camera, the combination with a rotatable camera-box, of a fixed stop device, a locking device carried by the box and in coöperative relation with the stop device, and means for simultaneously opening the shutter by the release of the locking device and for closing the shutter by the engagement of the locking device with the stop device.

25. In a panoramic camera, the combination with a rotatable camera-box, of a fixed stop device, a pivotal latch mounted upon the box and in coöperative relation to the stop device, and connecting means between the latch and the lens-shutter for opening and closing the latter by the unlocking and locking, respectively, of the latch.

26. In a panoramic camera, the combination with a rotatable camera-box, of a fixed stop device, locking means carried by the camera and in operative relation to the stop device, and an operating device common to the lens-shutter and the locking means and also constructed for the simultaneous operation thereof.

27. In a panoramic camera, the combination with a rotatable camera-box, of a fixed stop device, a locking device carried by the box and in coöperative relation to the stop device, and an operating air-bulb common to the locking device and the lens-shutter.

28. In a panoramic camera, the combination with a rotatable camera-box, of a fixed stop device, a locking device carried by the box and in operative relation to the stop device, a lens-shutter, having telescoped compressed-air-operated cylinders connected thereto, other telescoped compressed-air-operated cylinders for the locking device, and an operating air-bulb common to both sets of compressed-air-operated cylinders.

In testimony that we claim the foregoing as our own we have hereto affixed our signatures in the presence of two witnesses.

MAURICE L. AKERS.
WILLIS L. RICHARDS.

Witnesses:
E. T. PENKINS,
F. E. EVERITT.